(12) United States Patent
Charrat (10) Patent No.: US 9,793,961 B2
(45) Date of Patent: *Oct. 17, 2017

(54) COMMUNICATION METHOD BETWEEN A DUAL INTERFACE NFC CARD INSERTED INTO AN NFC TERMINAL, AND AN NFC DEVICE

(71) Applicant: INSIDE SECURE, Meyreuil (FR)

(72) Inventor: Bruno Charrat, Aix en Provence (FR)

(73) Assignee: Inside Secure, Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,884

(22) Filed: Jul. 28, 2016

(65) Prior Publication Data
US 2016/0337006 A1    Nov. 17, 2016

Related U.S. Application Data

(63) Continuation of application No. 14/370,653, filed as application No. PCT/FR2012/052755 on Nov. 29, 2012, now Pat. No. 9,407,328.

(30) Foreign Application Priority Data

Jan. 3, 2012    (FR) ...................... 12 50049

(51) Int. Cl.
 H04B 5/00       (2006.01)
 G06K 19/077     (2006.01)
 H04W 4/00       (2009.01)

(52) U.S. Cl.
 CPC ..... H04B 5/0093 (2013.01); G06K 19/07769 (2013.01); H04B 5/00 (2013.01); H04W 4/008 (2013.01)

(58) Field of Classification Search
 None
 See application file for complete search history.

(56) References Cited

U.S. PATENT DOCUMENTS 6,199,763 B1 *  3/2001  Thuringer .............. G06K 19/07
                                                      235/380
9,407,328 B2     8/2016  Charrat
                              (Continued)

FOREIGN PATENT DOCUMENTS

EP      2172877 A1    4/2010
FR      2897704 A1    8/2007
WO      99/21119 A1   4/1999

OTHER PUBLICATIONS

International Search Report and Written Opinion with partial English translation from PCT Patent Application No. PCT/FR2012/052755, mailed on Apr. 24, 2013, 11 pages.

(Continued)

*Primary Examiner* — Alejandro Rivero
(74) *Attorney, Agent, or Firm* — Brake Hughes Bellerman LLP (57) ABSTRACT

In a general aspect, a method for transmitting data between an NFC card and an external NFC device via a selected interface (e.g., contact or contactless), and further via a contactless interface of the NFC module when the contact interface of the NFC card is selected can include using an NFC card that includes an antenna circuit having an antenna coil with a magnetic axis and an electrically conductive screen extending near the antenna coil. The magnetic axis of the antenna coil can be substantially parallel to a plane defined by the NFC card and not cross the conductive screen. The contactless interface of the NFC card, when selected by the NFC card, can emit data by emitting bursts of magnetic field from the antenna coil, so as to compensate for effects of the conductive screen on a maximum distance for transmitting data by load modulation.

25 Claims, 5 Drawing Sheets

(56) References Cited

U.S. PATENT DOCUMENTS

| | | | | |
|---|---|---|---|---|
| 2003/0169152 A1* | 9/2003 | Charrat | ............... | G06K 7/0008 340/10.1 |
| 2004/0266486 A1* | 12/2004 | Deguchi | ............. | G06K 7/0008 455/562.1 |
| 2010/0090805 A1* | 4/2010 | Llbotte | ............. | G06K 19/0719 340/10.2 |
| 2010/0330904 A1* | 12/2010 | Stougaard | ............... | H04L 67/12 455/41.1 |
| 2014/0378051 A1 | 12/2014 | Charrat | | |

OTHER PUBLICATIONS

International Preliminary Report on Patentability with partial English translation for PCT Patent Application No. PCT/FR2012/052755, completed on Dec. 17, 2013, 19 pages.

* cited by examiner

COMMUNICATION METHOD BETWEEN A DUAL INTERFACE NFC CARD INSERTED INTO AN NFC TERMINAL, AND AN NFC DEVICE

CROSS REFERENCE TO RELATED APPLICATIONS

This application is a continuation of U.S. patent application Ser. No. 14/370,653, filed Jul. 3, 2014, now U.S. Pat. No. 9,407,328, which is a National Stage Entry of International Patent Application No. PCT/FR2012/052755, filed Nov. 29, 2012, which claims priority to French Application No. 1250049, filed Jan. 3, 2012, the disclosures of which are all incorporated herein by reference in their entireties.

BACKGROUND

The present invention relates to NFC cards (Near Field Communication), and more particularly NFC cards intended to be inserted into a terminal such as a mobile phone. The present invention also relates to a method for performing a contactless or near field communication between an NFC card and an external NFC device.

To allow a mobile phone not comprising any contactless communication interface to communicate with an external NFC device, contact and contactless dual interface NFC cards intended to be inserted into the phone have been developed. These cards are for example of the UICC card type (Universal Integrated Circuit Card) such as NFC SIM (Subscriber Identity Module), or of the NFC SD type (Secure Digital). An NFC SIM card comprising contact pads, a microprocessor, an NFC module, and an antenna coil has already been provided. This card can perform contact communications with the mobile phone through the contact pads and an NFC communication with an external NFC device through the antenna coil.

When the card and the external NFC device are placed sufficiently close to each other, the antenna coil of the card is inductively coupled to an antenna coil of the external NFC device, and data can be exchanged using conventional NFC techniques such as those defined by the standards ISO 14443, ISO 15693, and Sony Felica®.

In most applications, the external device emits a magnetic field whereas the NFC card is passive and sends data by load modulation. To that end, the antenna coil of the card is associated with passive components (e.g. capacitors) to form an antenna circuit tuned to a working frequency of the external device, for example 13.56 MHz.

Figure 1:
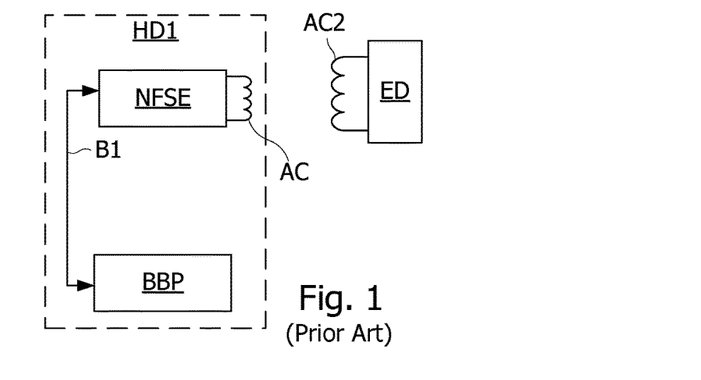
FIG. 1 previously described schematically shows a terminal in which a NFC SIM card is inserted.

FIG. 1 schematically shows a portable terminal HD1 comprising a main processor BBP. An NFC card referred to as NFSE is inserted into the terminal HD1 and connected by a contact interface and an electrical link B1 to the processor BBP. The card NFSE comprises an antenna circuit AC to communicate with an external NFC device ED. The link B1 may comply with the standard ISO 7816.

This solution is not satisfactory because portable terminals generally comprise metal parts or metal components, for example a printed circuit board. When an NFC card is inserted into such a terminal, such metal parts or components reduce the inductance of the antenna coil, thereby altering the tuning frequency of the antenna circuit and reducing the maximum communication distance between the NFC card and the external device ED.

It is difficult for NFC card manufacturers to know in advance the conditions in which an NFC card will be used, i.e. what the metallic environment of the card will be and how the NFC card will be arranged in relation to the printed circuit board, in particular whether its longitudinal axis will be parallel or perpendicular to an edge of the printed circuit board. The card location may significantly vary from terminal to terminal. The location may be more or less electromagnetically shielded, and the terminal may comprise a variable number of metal parts near the card. Consequently, the maximum possible communication distance from the card greatly depends on the card environment and may significantly vary depending on the terminal into which the card is inserted. In addition, the magnetic field emitted by the external device induces eddy currents in the metal parts, which create a counter magnetic field that tends to neutralize the magnetic field, thereby further reducing the maximum communication distance between the NFC card and the external device.

Figure 2:
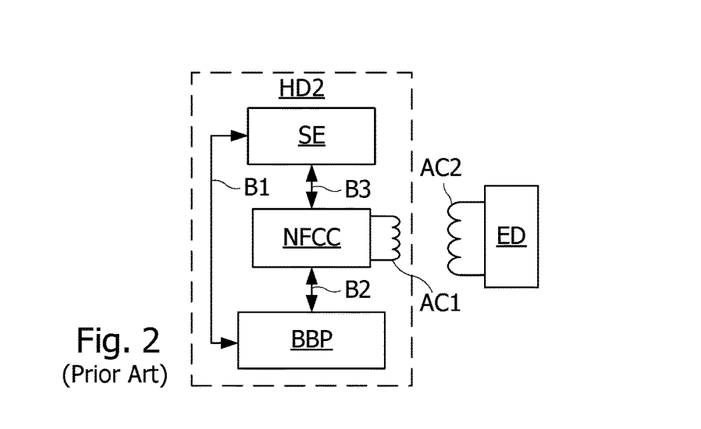
FIG. 2 previously described schematically shows a terminal comprising an NFC module, and in which a SIM card is inserted.

There are also mobile phones equipped with an NFC module to communicate with an external NFC device. In this case, the SIM card inserted into the phone does not need to comprise a contactless interface. Thus, FIG. 2 schematically shows a terminal HD2 comprising a main processor BBP and an NFC module referred to as NFCC connected to an antenna circuit AC1 and connected through a link B2 to the processor BBP. A SIM card referred to as SE is inserted into the terminal wherein it is connected through a contact interface and an electrical link B1 to the processor BBP. The SIM card may also be connected to the NFC module through a link B3.

This solution has the advantage of offering an antenna circuit for contactless communications, here the circuit AC1, which may be installed in the terminal and adapted to the metal parts present therein. The antenna circuit AC1 may therefore offer a maximum communication distance.

However, users of the terminal HD2 may be required to insert into their terminal a card having its own contactless interface, such as the card NFSE in FIG. 1. This case schematically shown in FIG. 3 may arise in particular when a user already having an NFC SIM card buys a new phone having its own NFC module. The result is that when the terminal is brought near an external NFC device, a conflict may occur between the card NFSE and the module NFCC. Indeed, the card NFSE and the module NFCC may simultaneously be called by an external NFC device which will see two different NFC devices in its field.

To solve this problem, the document WO 2011/079606 provides for adapting the main processor BBP of the terminal so that it sends the NFC SIM card a switching command so that it does not use its NFC interface terminal to perform contactless communications, but uses that of the terminal or the NFC module instead. This solution also implies that mobile phone manufacturers and NFC SIM card manufacturers, which are different, agree on the definition and processing of such switching commands.

In addition, the contactless interface of the NFC SIM card may in some cases offer a communication distance greater than that of the module NFCC. It may then be preferred to use the communication interface having the greatest communication distance. It is not possible to know in advance which contactless interface will have the greatest communication distance. Indeed, that of the contactless interface of the card NFSE depends on its position in the terminal HD2 and on the configuration of the metal parts present in the terminal HD2, which substantially vary from one model of terminal to another. In addition, the card NFSE may start a communication with an external NFC device ED without involving the processor BBP. The latter cannot therefore determine the contactless interface having the greatest communication distance, and thus select a contactless interface according to the communication distance.

In addition, if the card NFSE is configured to start or respond to a contactless communication request using its own contactless interface, the module NFCC must not respond to the signals it receives through its contactless interface, to avoid conflicts.

There is therefore a need to implement a near field communication method between a terminal comprising an NFC module and an NFC SIM card, and an external NFC device, avoiding the risks of conflict between the NFC module and the NFC SIM card. There is also a need to be able to choose the near field communication interface having the greatest communication distance or the best quality. It is also desirable that this communication method remain compatible with a terminal equipped with a SIM card, but comprising a single contactless interface, provided either in the SIM card inserted into the terminal, or in an NFC module of the terminal.

SUMMARY

Some embodiments relate to a contactless communication method between an NFC card with a contact and contactless dual interface, installed in a communication terminal, and an external NFC device, the terminal comprising an NFC module coupled to the contact interface of the card and comprising a contactless communication interface, the method comprising steps of: detecting by the card the presence of the NFC module connected to its contact interface, selecting by the card one or the other of the contact and contactless interfaces of the card, depending on the result of the detection of the NFC module presence, and transmitting signals between the card and the NEC device by the selected interface, and if the contact interface of the card is selected, by the contactless interface of the NFC module. According to one embodiment, if the card detects the presence of the NFC module connected to its contact interface, the card keeps its contactless interface active and continues to monitor its contactless interface.

According to one embodiment, the contact interface of the card is coupled to the NFC module by a wire link of SWP type, and the card detects the presence of the NFC module connected to its contact interface by receiving an activation signal for activating the NFC module through the wire link.

According to one embodiment, the card activates the wire link by transmitting on the wire link to the NFC module, a response signal in response to the activation signal.

According to one embodiment, if the card detects the presence of the NFC module connected to its contact interface, the card does not use its contactless interface and activates a wire link linking its contact interface to the NFC module.

According to one embodiment, if the card detects the presence of the NFC module connected to its contact interface, the card compares data transmitted to the NFC module with data transmitted by the NFC module to an external NFC device and compares data that the NFC module transmits to it with data emitted by the external NFC device.

According to one embodiment, if the card detects the presence of the NFC module, the card receives data from an external NFC device, and if the NFC module does not transmit the data received from the external device to it within a first time, it emits data in response to the data received to the external NFC device through its contactless interface, and otherwise, it transmits the data in response to the NFC module through its contact interface, the NFC module transmitting the data in response to the external NFC device through its contactless interface.

According to one embodiment, if the card detects the presence of the NFC module, the card emits data in response to data received from an external NFC device through its contactless interface, while the NFC module continues to monitor its contactless interface to transmit the data received from the external NFC device to the card if the card did not emit data in response to the NFC device within a second time.

According to one embodiment, if the card detects the presence of the NFC module, the card does not activate the wire link, while the NFC module forwards data received from an external NFC device, to a processor of the terminal, connected to the NFC module, and forwards data received from the processor to the NFC device.

According to one embodiment, if the card detects the presence of the NFC module, the card does not activate the wire link and transmits data through its contactless interface to the NFC module which forwards this data to a processor of the terminal connected to the NFC module, and the NFC module forwards through its contactless interface to the card, data received from the processor.

According to one embodiment, the card comprises an antenna circuit comprising at least one antenna coil having a magnetic axis, and at least one electrically conductive screen extending near the antenna coil, the magnetic axis of the antenna coil being substantially parallel to the plane of the card and not crossing each conductive screen, and if the card emits data, it emits bursts of magnetic field by means of the antenna coil so as to compensate for negative effects of each conductive screen on the maximum distance for transmitting data by load modulation.

Some embodiments may also relate to a terminal comprising an NFC module and a card with contact and contactless dual interface, the NFC module being coupled to the contact interface of the card and comprising a contactless interface, the NFC module and the card being configured to implement the method as above-defined.

According to one embodiment, the card comprises an antenna circuit comprising at least one antenna coil having a magnetic axis, an integrated circuit connected to the antenna circuit, and at least one electrically conductive screen extending near the antenna coil, the magnetic axis of the antenna coil being substantially parallel to the plane of the card, and not crossing the conductive screen, no magnetically permeable material being arranged between the conductive screen and the antenna coil.

According to one embodiment, the card comprises an antenna circuit comprising at least one antenna coil having a magnetic axis, and an integrated circuit connected to the antenna circuit, the magnetic axis of the antenna coil being substantially parallel to the plane of the card and forming an angle of $45°\pm25°$ in relation to a longitudinal axis of the card.

According to one embodiment, the antenna circuit of the card has a tuning frequency which has been set in the presence of the conductive screen, and which does not detune when a metal element is placed near the conductive screen.

According to one embodiment, the antenna coil of the card is wound around a magnetically permeable core.

According to one embodiment, the terminal comprises a processor connected to the card by an ISO 7816 link, the card being coupled to the NFC module by an SWP link.

BRIEF DESCRIPTION OF THE DRAWINGS

Some examples of embodiments of the present invention will be described below, in relation with, but not limited to, the appended figures, in which.

DETAILED DESCRIPTION

FIGS. 4 to 7 show sequences of steps of initializing and communicating with an external NFC device ED, executed by an NFC module referred to as NFCC and an NFC card referred to as NFSE, installed in the terminal HD2. The card NFSE may be an NFC SIM card intended to be inserted into a mobile phone.

Figure 4:
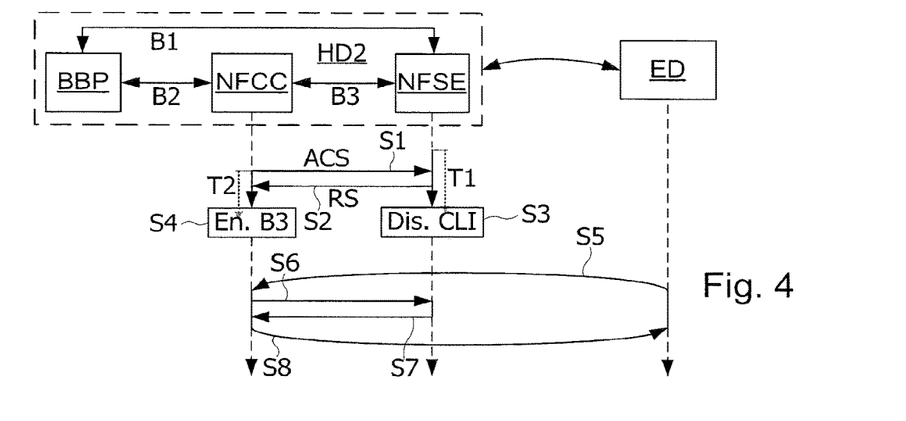
FIGS. 4 to 7 show sequences of steps executed by an NFC controller and an NFC SIM card, installed in a terminal, according to various embodiments.

In an embodiment shown in FIG. 4, the module NFCC and the card NFSE execute an initialization procedure comprising steps S1 to S3. At step S1, the module NFCC emits on the link B3 an activation signal ACS and triggers a time out T2. Step S1 may be triggered when powering up the module NFCC. As for the card NFSE, it triggers a time out T1 upon powering up in step S2. If it does not receive any activation signal on the link B3 before the end of the time out T1, it considers that it is not connected to an NFC module.

That way, the card NFSE may determine whether or not it is connected to an NFC module able to perform a near field communication with an external reader, i.e. whether it is inserted into a terminal of the type HD2 (FIG. 2 or 3), or into a terminal of the type HD1 (FIG. 1). The card NFSE may then decide to respond to the activation signal by emitting a response signal RS indicating it is ready to exchange data (Step S2), or not to respond to this signal. The card NFSE may also decide to maintain its contactless interface active or to deactivate it. If the card NFSE responds to the activation signal (Step S2) before the end of the time out T2, the module NFCC may determine that it is connected to a SIM card with or without contactless interface.

In the embodiment shown in FIG. 4, the card NFSE responds to the activation signal ACS emitted by the module NFCC, and deactivates its contactless interface CLI at step S3. That way, if the card NFSE detects the presence of the module NFCC, it uses the contactless interface of the module NFCC instead of using its own contactless interface. The module NFCC then switches to a mode in which the link B3 is activated at step S4. In this mode, steps S5 to S8 may be executed. At step S5, the module NFCC receives data through its contactless interface from an external NFC device ED. At step S6, the module NFCC forwards the data received on the link B3 to the card NFSE. The module NFCC also forwards to its contactless interface (step S8), data received from the card NFSE through the link B3 at step S7.

In another embodiment, the card NFSE systematically responds to the activation signal ACS emitted by the module NFCC, but activates its contactless interface CLI or keeps it activated. The card NFSE may thus receive data from an external NFC device ED before the NFC module forwards the same data which it has also received through its contactless interface. The card NFSE may then prepare a response to this data before receiving it from the module NFCC.

Figure 5:
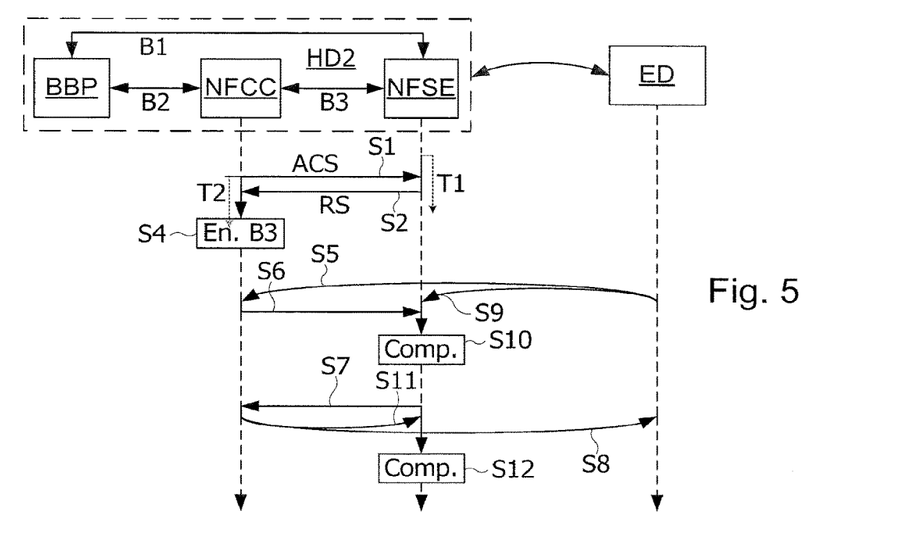

In another embodiment shown in FIG. 5, the card NFSE systematically responds to the activation signal ACS, activates its contactless interface CLI or keeps it activated. In this embodiment, the card NFSE communicates with an external NFC device ED through the module NFCC, and thanks to its contactless interface which has remained active, monitors the data exchanged between the module NFCC and the device ED. Thus, steps S5 and S6 are executed in parallel to a step S9 of receiving by the card NFSE on its contactless interface CLI data transmitted by the device ED. Then, the card NFSE executes a step S10 where it compares the data received at step S6 with the data received at step S9. Likewise, steps S7, S8 are executed in parallel to a step S11 of receiving by the card NFSE on its contactless interface CLI data transmitted by the module NFCC at step S8. Then, the card NFSE executes a step S12 where it compares the data emitted at step S7 with the data received at step S11. If any inconsistency is thus detected between the data the card NFSE receives or transmits to the module NFCC, and the data it receives from its contactless interface, it switches to an error mode.

Figure 6:
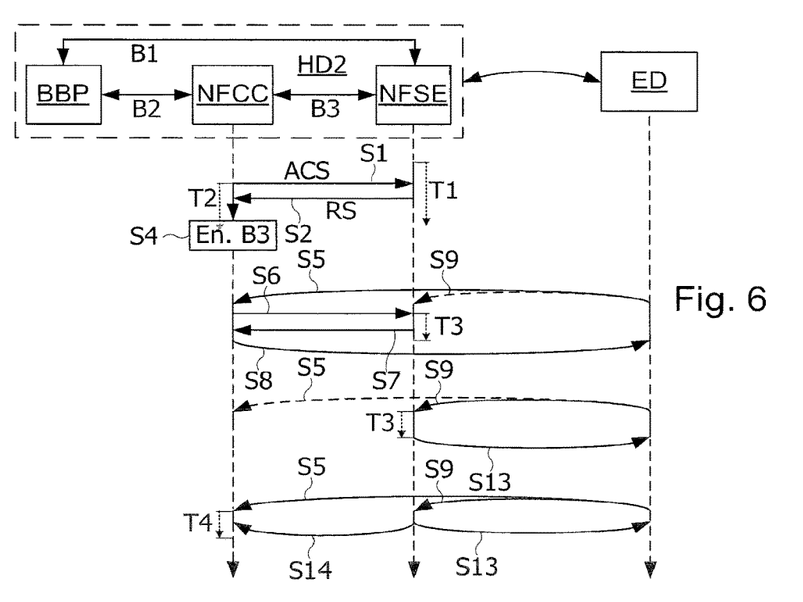

In other embodiments shown in FIG. 6, the card NFSE systematically responds to the activation signal ACS, and activates its contactless interface CLI or keeps it activated. In one embodiment, the contactless interfaces of the module NFCC and of the card NFSE are active to select the most efficient contactless interface or the one which picks up the data transmitted by an external NFC device. This data may be received by the contactless interface of the module NFCC at step S5, and by the contactless interface CLI of the card NFSE at step S9.

If the module NFCC alone receives this data through its contactless interface, the data is forwarded at step S6 by the module NFCC through the link B3 to the card NFSE. The card NFSE then responds to the data thus received using the link B3 at step S7, and the module NFCC forwards the response received from the card NFSE through its contactless interface toward the device ED at step S8.

If the module NFCC does not receive the data emitted by the device ED, for example before the end of a time out T3 triggered by the card NFSE upon receiving the data at step S9, the card NFSE responds to this data at step S13 using its interface CLI.

If the contactless interfaces of the module NFCC and of the card NFSE both receive the data emitted by the device ED, steps S10 to S12 (FIG. 5) may be executed by the card NFSE. In another embodiment shown in FIG. 6, priority is given to the card NFSE. To that end, the module NFCC triggers a time out T4 upon receiving data emitted by the device ED (step S5), and starts monitoring its contactless interface. If before the end of the time out T4, the module NFCC detects at step S14 that the card NFSE responded to the device ED at step S13, it does not execute steps S6 and S8.

Figure 7:
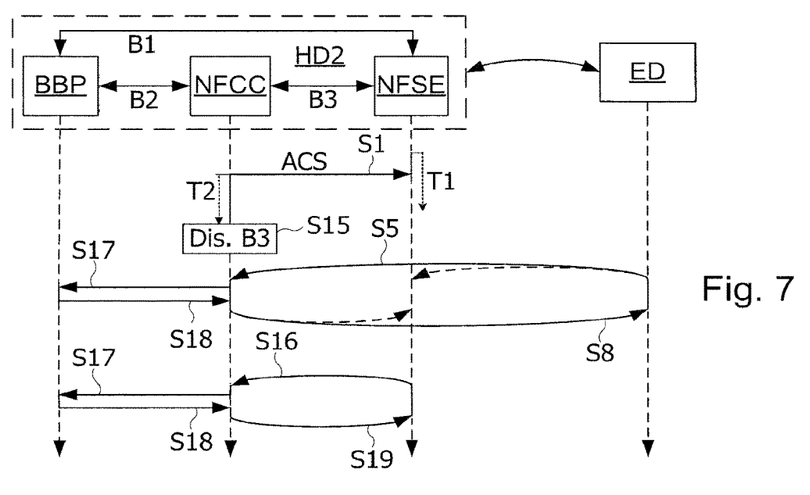

In another embodiment shown in FIG. 7, the card NFSE does not transmit the response signal RS in response to the activation signal ACS to the module NFCC through the link B3 before the end of the time out T2. The module NFCC then switches to a mode wherein it considers that it is not connected to a SIM card (step S15). In addition, the card NFSE keeps its contactless interface CLI active. Thus, the terminal HD2 has two near field or contactless communication interfaces which are simultaneously active. In this case, the module NFCC transmits the data received by its contactless interface at step S5 to the processor BBP through the link B2 (step S17), and transmits toward its contactless interface (step S8) the data emitted by the processor BBP through the link B2 at step S18 in response to the data emitted by the device ED at step S5.

In addition, the card NFSE may communicate with the processor BBP through its contactless interface CLI. Thus, the data emitted by the contactless interface of the card NFSE (step S16) is received by the contactless interface of the module NFCC and forwarded through the link B2 to the processor BBP (step S17). Reciprocally, the data emitted by the processor BBP (step S18) in response to the data received at step S16, is forwarded by the contactless interface of the module NFCC and may thus be picked up by the contactless interface CLI of the card NFSE (step S19). The module NFCC then operates in an NFC reader mode.

In one embodiment, the card NFSE communicates with the processor BBP (link B1) in accordance with the ISO 7816 protocol, and with the module NFCC (link B3) in accordance with the SWP protocol (Single Wire Protocol—Cf. ETSI TS 102 613).

Figure 8:
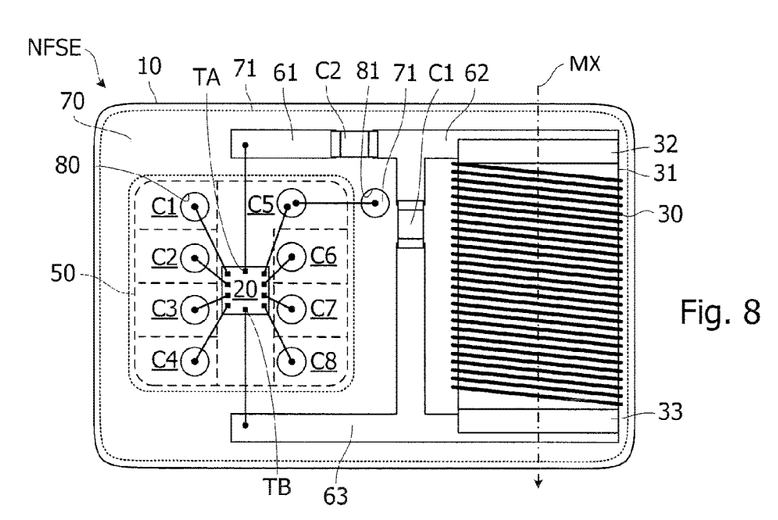
FIG. 8 schematically shows the internal structure of an NFC SIM card, according to one embodiment.
Figure 9:
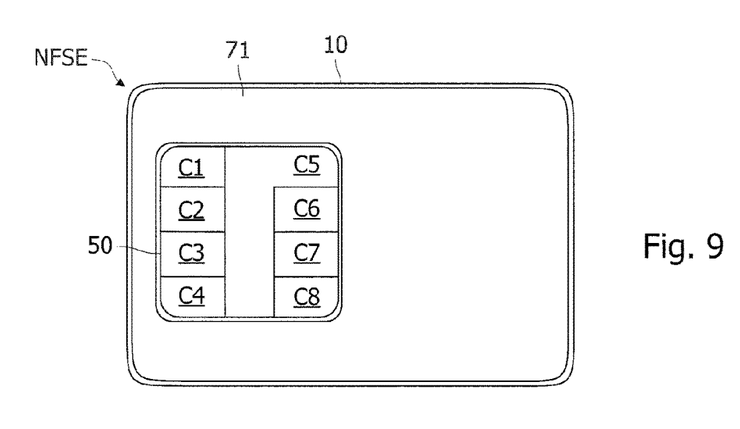
FIGS. 9 and 10 are front and longitudinal cross-sectional views of the card shown in FIG. 8.
Figure 10:
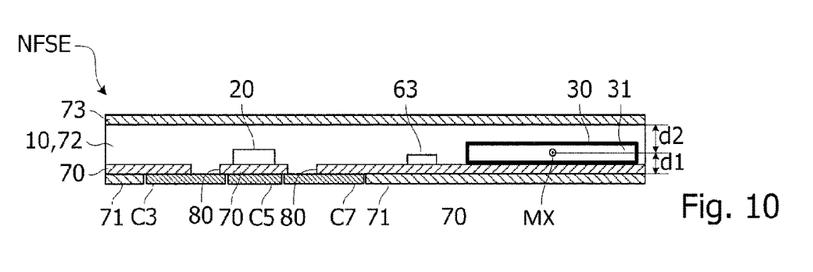

FIGS. 8, 9, 10 are respectively internal top, bottom and cross-sectional views of the card NFSE, according to one embodiment. The card NFSE comprises a plastic body 10, an integrated circuit 20, a tuned antenna circuit comprising an antenna coil 30 and tuning capacitors C1, C2, and a group 50 of contact pads (in dotted line in FIG. 8). The integrated circuit 20 is a contact/contactless dual device and is designed to perform contact or contactless communications. The integrated circuit 20 may be a secure integrated circuit for an NFC SIM card.

The group 50 of contact pads comprises eight conventional contacts ISO 7816 C1 (Vcc), C2 (RST), C3 (CLK), C4 (RFU), C5 (GND), C6 (Vpp), C7 (I/O), and C8 (RFU), to which the terminals of the integrated circuit 20 are connected. The integrated circuit 20 comprises additional connection terminals TA, TB connected to the antenna coil 30 and to the capacitors C1, C2.

The antenna coil 30 has several coaxial non-coplanar windings and a magnetic axis MX substantially parallel to the plane of the card. "Substantially parallel to the plane of the card" means that the magnetic axis MX is at least parallel to the upper or lower face of the body 10, assuming that the upper or lower face of the card is plane, and with an accuracy which depends on the card manufacturing process, for example ±10°. The antenna coil 30 may be wound around a magnetically conductive core 31, and the core may be in a highly permeable material such as ferrite.

In one embodiment, the card NFSE also comprises at least one electrically conductive screen, here two screens. A first screen 71 (FIGS. 8, 9, 10) is arranged below the antenna coil 30 at a distance d1 from its magnetic axis. A second screen 73 (FIG. 10) is arranged above the antenna coil 30 at a distance d2 from its magnetic axis. No magnetically conductive material, in particular ferrite, is arranged between the antenna coil and the conductive screens 71, 73.

In the embodiment shown in FIGS. 8 to 10, the first and second conductive screens 71, 73 are substantially planar and preferably directed so that they are substantially parallel to the magnetic axis MX of the antenna coil 30. "Substantially parallel" means that the screens are parallel to the magnetic axis MX with an accuracy which depends on the card manufacturing process, for example ±10°. The conductive screens 71, 73 respectively extend over the lower and upper faces of the card and cover the surfaces of the upper and lower faces nearly entirely. Each screen 71, 73 has a thickness that in some embodiments may be at least equal to the skin effect depth at the tuning frequency of the antenna circuit, for example approximately 18 µm for a 13.56 MHz tuning frequency. In one embodiment, at least one screen, for example the screen 71, is connected to the ground potential of the integrated circuit.

As a general rule concerning the orientation of the conductive screens in relation to the magnetic axis MX of the antenna coil, the conductive screens must be arranged so that they do not cross the magnetic axis. This rule is obviously met when the screens 71, 73 are planar and oriented substantially parallel to the magnetic axis MX.

The antenna circuit comprising the antenna coil 30 and the tuning capacitors C1, C2, is tuned to a specific working frequency, for example 13.56 MHz as required by standards ISO 14443, ISO 15693, and Sony Felica®. The tuning is done in the presence of the screens 71, 73. The screens 71, 73 protect the tuned antenna circuit from the detuning influence that metal parts may have on the tuning frequency once the card is arranged inside a handheld device such as a mobile phone.

In other words, given that the metallic environment of the card NFSE is generally not known in advance and depends on the device into which the card is inserted, the screens 71, 73 allow a fixed known metal disturbance to be created near the antenna coil 30. It is therefore possible to tune the antenna circuit since the metal disturbance of the antenna is fixed and does not depend on the device into which the card is inserted. Therefore, the conductive screens 71, 73, if they are provided, create a "voluntary disturbance" of the antenna circuit which is taken into account when the antenna circuit is tuned, and which will prevail over the disturbances from the metal parts of the device into which the card NFSE will be inserted.

In the embodiment shown in FIGS. 8 to 10, the card NFSE is made from a printed circuit board (PCB) comprising an electrically insulating dielectric substrate 70, and upper and lower electrically conductive layers arranged on the upper and lower faces of the substrate 70. The lower conductive layer is etched to form the group 50 of contact pads C1-C8 and the screen 71, which are isolated from each other by gaps. The upper conductive layer is etched to form conductive tracks 61, 62, 63.

The terminal TA of the integrated circuit 20 is wire bonded to the conductive track 61. The terminal TB of the integrated circuit 20 is wire bonded to the conductive track 63. Other terminals of the integrated circuit are wire bonded to the contact pads C1-C8 through openings 80 made in the substrate 70. Optionally, the first conductive screen 71 is wire bonded to the ground pad C5, using a wire passing through a further opening 81 in the substrate 70, then passing through one of the openings 80 to the contact pad C5.

The capacitor C1 has a first terminal connected to the conductive track 62 and a second terminal connected to the conductive track 63. The capacitor C2 has a first terminal connected to the conductive track 61 and a second terminal connected to the conductive track 62. The antenna coil 30 has a first terminal 32 connected to the conductive track 62 and a second terminal 33 connected to the conductive track 63. The capacitor C1 is therefore connected in parallel with the antenna coil 30 and the capacitor C2 is connected in series between the first terminal 32 of the antenna coil and the terminal TA of the integrated circuit 20.

The integrated circuit 20, the antenna coil 30, the capacitors C1, C2, and the bonding wires are encapsulated in a polymeric material 72 extending over the substrate 70, such as resin or Polyvinyl Chloride (PVC), which forms the body 10 of the card.

The second conductive screen 73 is formed or deposited on the upper face of the card. It may be a metal plate or may comprise one or more layers of a conductive material, for example a conductive paint.

In one embodiment, the card has a total thickness of 804 µm, the substrate 70 has a thickness of 100 µm, each conductive screen 71, 73 has a thickness of 18 µm, and the antenna coil 30 including its core 31 has a thickness of 500 µm. The distance d1 between the center of the antenna coil and the first conductive screen 71 is 368 µm and the distance d2 between the center of the antenna coil and the first conductive screen 71 is 400 µm.

According to one embodiment, the integrated circuit 20 is configured to send data on its contactless interface by inductive coupling using an active load modulation method. This method comprises a step of emitting, in the presence of an external NFC device continuously emitting a first alternating magnetic field, bursts of a second alternating magnetic field. Such magnetic field bursts are perceived by the external device as a passive load modulation. This technique was proposed by the applicant in patent EP 1 327 222 (U.S. Pat. No. 7,098,770B2), cf. FIGS. 4A to 4E, page 8, table 4, paragraph 074.

As far as the sending of data by the card is concerned, this load modulation method allows a satisfactory maximum communication distance to be obtained in spite of the presence of the conductive screens 71, 73.

Figure 11:
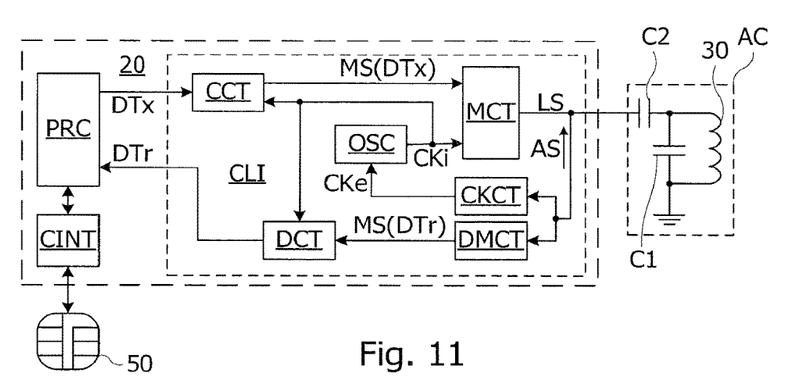
FIG. 11 schematically shows internal circuits of the card shown in FIG. 8.

FIG. 11 is a block diagram showing an example of architecture of the integrated circuit 20 implementing an active load modulation method. The integrated circuit 20 comprises a contact communication interface CINT, a processor PRC, and a contactless communication interface CLI.

Figure 3:
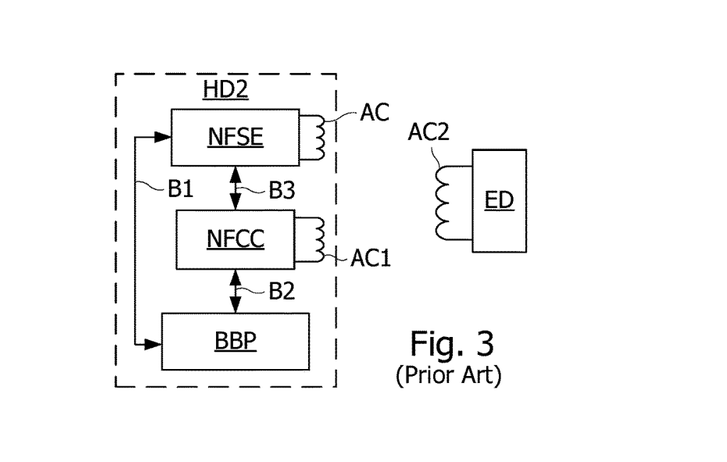
FIG. 3 previously described schematically shows a terminal comprising an NFC module, and in which an NFC SIM card is inserted.

The contact communication interface CINT is linked to the group 50 of contact pads C1-C8 and has inputs/outputs connected to the processor PRC. The interface CINT performs protocol management and data coding/decoding during a contact communication between the processor PRC and an external processor, such as the baseband processor BBP of a mobile phone HD1, HD2 (FIGS. 1, 3). The interface CINT also performs protocol management and data coding/decoding during a contact communication between the processor PRC and the module NFCC of the terminal HD2.

In one embodiment, the contacts C1, C5 are respectively connected to a voltage source and to the ground of the terminal HD1, HD2. The contact C2 is connected to an output of a reset circuit of the terminal HD1, HD2. The contact C3 is connected to a clock circuit of the terminal HD1, HD2. The contact C6 is connected to a data input/output of the module NFCC and the contact C7 is connected to a data input/output of the processor BBP.

The contactless communication interface CLI comprises a coding circuit CCT, a decoding circuit DCT, a modulation circuit MCT, a demodulation circuit DMCT, a clock circuit CKCT, and a synchronous oscillator OSC. The contactless communication interface CLI also includes the antenna circuit AC comprising the capacitors C1, C2 and the antenna coil 30 previously described.

During a contactless communication with an external device ED, the external device ED emits a magnetic field oscillating at the working frequency. The processor PRC provides the contactless interface CLI with data DTx to be sent to the external device ED, and processes data DTr provided by the contactless interface, received from the external device.

During such contactless communication, an antenna signal AS is induced in the antenna circuit AC by the magnetic field. The clock circuit CKCT receives the antenna signal AS and extracts therefrom an external clock signal CKe. The external clock signal CKe is, in general, of the same frequency as the carrier frequency.

The synchronous oscillator OSC receives the external clock signal CKe and supplies an internal clock signal CKi. The synchronous oscillator OSC has a synchronous operating mode where the phase and the frequency of the internal clock signal CKi are slaved to those of the external clock signal, and a free-oscillation operating mode where the external clock signal no longer drives the oscillator.

When the external device ED sends data DTr to the integrated circuit 20, it modulates the magnetic field by means of a data-carrying modulation signal MS(DTr). Since the induced antenna signal AS is the image of the magnetic field, the data-carrying modulation signal is also found in the antenna signal AS.

The demodulation circuit DMCT extracts from the antenna signal AS the modulation signal MS(DTr), and supplies it to the decoding circuit DCT. The decoding circuit DCT decodes the data DTr and supplies it to the processor PRC.

When the integrated circuit 20 sends data DTx to the external device ED, the data to be sent DTx is first supplied to the coding circuit CCT and the synchronous oscillator OSC is set in the free-oscillation operating mode. The coding circuit CCT supplies a data-carrying modulation signal MS(DTx) to the modulation circuit MCT.

The modulation circuit MCT combines the data-carrying modulation signal MS(DTx) and the internal clock signal CKi and supplies an active load modulation signal LS to the antenna circuit AC. The active load modulation signal LS comprises bursts of the internal clock signal CKi separated by unmodulated periods where the signal LS has a default value. For example, the modulation circuit MCT supplies the internal clock signal CKi as modulation signal LS when MS(DTx)=1, and sets its output to 0 when MS(DTx)=0. Thus, the signal LS is 0 when the signal MS(DTx) is on 0, and copies the signal CKi when the signal MS(DTX) is on 1. The antenna circuit AC thus receives bursts of the internal clock signal CKi and the antenna coil 30 emits corresponding bursts of a magnetic field. These magnetic field bursts are detected by the external device ED as a passive load modulation. The external device ED extracts from its antenna coil AC2 the data-carrying modulation signal MS(DTx), and then decodes the data DTx sent by the integrated circuit 20.

Figure 12:
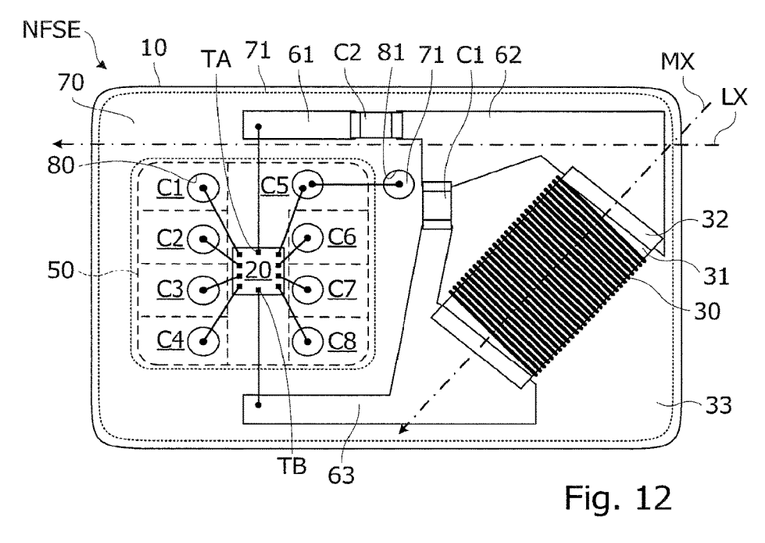
FIG. 12 schematically shows the internal structure of an NFC SIM card, according to another embodiment.

In one embodiment shown in FIG. 12, the antenna coil of the card NFSE is arranged so that its magnetic axis MX has an angle of around 45° (±10) in relation to a longitudinal axis LX of the card NFSE. The embodiment shown in FIG. 12 only differs from that shown in FIGS. 8 to 10 in that the coil has a magnetic axis MX forming an angle of 45° (±10) in relation to a longitudinal axis LX of the card NFSE. If the card has a square shape, the longitudinal axis LX may be any axis of the card parallel to a lateral side of the card.

When the card NFSE is being used after being placed in the card connector of a portable device, it is generally near a printed circuit board of the device, at a vertical distance or "distance Z" therefrom, in relation to the XY plane of the printed circuit board. Such a distance is generally unpredictable for the card manufacturer as far as the production of "generic" cards is concerned (i.e. cards intended for any type of mobile phone). This Z-distance depends on the structure of the device and the location of the card connector. The card connector may be mounted directly on the printed circuit board or arranged several millimeters above it. Also unpredictable is the XY location of the card in relation to the printed circuit board, as well as the orientation of the magnetic axis MA of the antenna coil 30 in relation to the edges of the printed circuit board.

In these conditions eddy currents appear in the printed circuit board during a contactless communication. Such eddy currents tend to neutralize the magnetic field emitted by the external device ED by generating an induced local counter magnetic field due to Lenz's law. The eddy currents generally circulate on the periphery of the printed circuit board and the counter magnetic field appears near the edges of the printed circuit board.

It can be observed that when the card NFSE is arranged so that the antenna coil 30 is near one of the edges of the printed circuit board of a mobile phone, its magnetic axis at 45.degree. from the edge, and when the Z-distance is small, the magnitude of the counter magnetic field prevails over that of the external magnetic field and improves the reception of data DTr sent by the external device ED. Therefore, the counter magnetic field is sensed by the antenna coil 30 instead of the original magnetic field, allowing the card NFSE to receive data from the external device ED with a greater maximum communication distance. If the core 31 of the coil 30 is made of a highly permeable material such as ferrite, the core concentrates the magnetic field lines and the maximum communication distance is further increased.

In addition, it will be understood that the reception of data DTr sent by the external device ED would be further improved if the magnetic axis of the antenna coil was at 90° to the edge of the PCB. However, arranging the antenna coil 30 so that its magnetic axis MX is approximately at an angle of 45° in relation to the longitudinal axis LX of the card is a good compromise taking into account the fact that the card could also be arranged perpendicularly to the edge.

It will be clear to those skilled in the art that the present invention is susceptible of various embodiments and applications. In particular, the invention is not limited to a wire link of SWP type between the card NFSE and the module NFCC, and to the corresponding communication protocol.

The invention is not limited either to the embodiments of the card shown in FIGS. 8 to 12, which are only shown as examples of a card integrating its own antenna coil. On the contrary, the invention applies to any card susceptible of being inserted into a terminal such as a mobile phone and having contact and contactless or near field communication interfaces.

The invention is not limited either to an embodiment of the card in which the magnetic axis MX of the antenna coil is at a 45°±10° angle in relation to the longitudinal axis LX of the card. In other embodiments, the magnetic axis MX of the antenna coil may be at 45°±25° in relation to the longitudinal axis of the card, i.e. comprised between 20° and 70°. Generally speaking, the minimum and maximum angles between the magnetic axis MX and the longitudinal axis LX may be defined by experiments, so that the magnitude of the counter magnetic field improves the reception of data sent by the external device ED in both arrangements of the card.

In addition, different known methods in the field of chip card manufacturing may be used to manufacture different embodiments of a card according to the present invention. In some embodiments, each conductive screen may be embedded within the body of the card and may extend near the lower or upper face of the card. The upper and/or lower face of the card may be non-planar. One and/or the other of the screens may be curved instead of planar. Each screen may extend over only a part of the surface of the card. The card may be powered by a battery and therefore may not have any contact pad for the power supply of the card. The card may also be purely passive and configured to send data by passive load modulation, and extract a power supply voltage from the magnetic field emitted by the external NFC device.

In addition, in the present description and the claims, the term "NFC" should be taken to mean any type of contactless communication performed by inductive coupling, whatever the protocol used and the working frequency. Furthermore, the term "NFC card" should be taken to mean any type of handheld support having NFC capabilities.

The invention claimed is:

1. A method for communication between a Near Field Communication (NFC) card installed in a terminal and an external NFC device, the method comprising:
   detecting, by the NFC card, an NFC module connected to a contact interface included in the NFC card, the NFC card further including a contactless interface, the NFC module including a contactless interface;
   selecting, by the NFC card for communication with the external NFC device, one of the contactless interface of the NFC card and the contact interface of the NFC card; and
   transmitting data between the NFC card and the external NFC device via the selected interface, and further via the contactless interface of the NFC module when the contact interface of the NFC card is selected,
   the NFC card further including:
      an antenna circuit having an antenna coil with a magnetic axis, the antenna coil having windings that are non-coplanar with a plane defined by the NFC card; and
      an electrically conductive screen, the magnetic axis of the antenna coil being substantially parallel to the plane defined by the NFC card and substantially parallel to a plane defined by the conductive screen, such that the magnetic axis does not cross the conductive screen,
      the contactless interface of the NFC card, when selected by the NFC card, emitting data by emitting bursts of magnetic field from the antenna coil so as to compensate for effects of the conductive screen on a maximum distance for transmitting data by load modulation.

2. The method of claim 1, wherein the NFC card detects the NFC module by receiving an activation signal for activating the NFC module through a wire link between the NFC card and the NFC module.

3. The method of claim 2, wherein the NFC card activates the wire link by transmitting, on the wire link to the NFC module, a response signal in response to the activation signal.

4. The method of claim 1, wherein the NFC card selecting the contact interface of the NFC card includes the NFC card activating a wire link linking the contact interface of the NFC card to the NFC module.

5. The method of claim 1, further comprising, when the contact interface of the NFC card is selected:
comparing, by the NFC card, data transmitted to the NFC module through the contact interface of the NFC card with data transmitted by the NFC module to the external NFC device and received through the contactless interface of the NFC card; and
comparing, by the NFC card, data received from the NFC module through the contact interface of the NFC card with data received from the external NFC device through the contactless interface of the NFC card.

6. The method of claim 1, further comprising, when the contact interface of the NFC card is selected:
receiving, by the NFC card, first data from the external NFC device through the contactless interface of the NFC card;
in the event the NFC card does not receive the first data from the NFC module through the contact interface of the NFC card before a timeout occurs, emitting, by the NFC card in response to the first data, second data to the external NFC device through the contactless interface of the NFC card; and
in the event the NFC card does receive the first data from the NFC module through the contact interface of the NFC card before a timeout occurs, transmitting, by the NFC card, the second data to the NFC module through the contact interface of the NFC card, the NFC module transmitting the second data to the external NFC device through the contactless interface of the NFC module.

7. The method of claim 1, further comprising, when the contact interface of the NFC card is selected:
emitting, via the contactless interface of the NFC card, second data in response to first data received from the external NFC device;
monitoring, by the NFC module, the contactless interface of the NFC module; and
in the event, based on the monitoring, the NFC card does not emit the second data to the external NFC device before a timeout occurs, receiving and transmitting, by the NFC module, the first data to the NFC card through the contact interface of the NFC card.

8. The method of claim 1, further comprising, when the contact interface of the NFC card is selected:
forwarding, by the NFC module, data received from the external NFC device to a processor of the terminal; and
forwarding, by the NFC module, data received from the processor to the external NFC device.

9. The method of claim 1, further comprising, when the contact interface of the NFC card is selected:
transmitting, via the contactless interface of the NFC card, data to the NFC module;
forwarding, by the NFC module, the data to a processor of the terminal, and
forwarding, via the contactless interface of the NFC module to the contactless interface of the NFC card, data received from the processor.

10. The method of claim 1, further comprising receiving, at the contactless interface of the NFC card:
data from the external NFC device when the contactless interface of the NFC card is selected; and
data exchanged between the NFC module and the external NFC device, when the contact interface of the NFC card is selected.

11. A terminal comprising:
a Near Field Communication (NFC) card including a contact interface and a contactless interface, the NFC card being configured to:
detect a NFC module connected to the contact interface of the NFC card, the NFC module including a contactless interface;
select, based on the detecting, one of the contact interface of the NFC card and the contactless interface of the NFC card; and
transmit data to an external NFC device using the selected interface, the contactless interface of the NFC module being configured to transmit data received by the NFC module via the contact interface of the NFC card;
an antenna circuit having an antenna coil with a magnetic axis, the antenna coil having windings that are non-coplanar with a plane defined by the NFC card; and
an electrically conductive screen, the magnetic axis of the antenna coil being substantially parallel to the plane defined by the NFC card and substantially parallel to a plane defined by the conductive screen, such that the magnetic axis does not cross the conductive screen.

12. The terminal of claim 11, wherein the NFC card is further configured to receive, at the contactless interface of the NFC card:
data from the external NFC device when the contactless interface of the NFC card is selected; and
data exchanged between the NFC module and the external NFC device when the contact interface of the NFC card is selected.

13. The terminal of claim 11, wherein the magnetic axis of the antenna coil forms an angle of 45°±25° in relation to a longitudinal axis of the NFC card.

14. The terminal of claim 11, wherein the antenna circuit of the NFC card has a tuning frequency that has been set in presence of the conductive screen, and does not detune when a metal element is placed near the conductive screen.

15. The terminal of claim 11, wherein the antenna coil of the NFC card is wound around a magnetically permeable core.

16. The terminal of claim 11, further comprising a processor connected to the NFC card by an ISO 7816 link, the NFC card being coupled to the NFC module by an SWP link.

17. The terminal of claim 11, wherein the contact interface of the NFC card is coupled to the NFC module by a wire link of an SWP type, and the NFC card is further configured to detect the NFC module connected to the contact interface of the NFC card by receiving an activation signal for activating the NFC module through the wire link.

18. The terminal of claim 17, wherein the NFC card is further configured to activate the wire link by transmitting, via the wire link to the NFC module, a response signal in response to the activation signal.

19. The terminal of claim 11, wherein the NFC card is further configured to activate a wire link linking the contact interface of the NFC card to the NFC module when the NFC card selects the contact interface of the NFC card.

20. The terminal of claim 11, wherein the NFC card, when the contact interface of the NFC card is selected, is further configured to:
compare data transmitted to the NFC module through the contact interface of the NFC card with data transmitted by the NFC module to an external NFC device and data that the NFC card receives through the contactless interface of the NFC card; and compare data the NFC card receives from the NFC module through the contact interface of the NFC card with data the NFC card receives from the external NFC device through the contactless interface of the NFC card.

21. The terminal of claim 11, wherein the NFC card, when the contact interface of the NFC card is selected, is further configured to:
- receive, by the NFC card, first data from the external NFC device through the contactless interface of the NFC card;
- in the event the NFC card does not receive the first data from the NFC module through the contact interface of the NFC card before a timeout occurs, emit, by the NFC card in response to the first data, second data to the external NFC device through the contactless interface of the NFC card; and
- in the event the NFC card does receive the first data from the NFC module through the contact interface of the NFC card before a timeout occurs, transmit, by the NFC card, the second data to the NFC module through the contact interface of the NFC card, the NFC module transmitting the second data to the external NFC device through the contactless interface of the NFC module.

22. The terminal of claim 11, wherein the NFC card, when the contact interface of the NFC card is selected, is further configured to, via the contactless interface of the NFC card, transmit second data in response to first data received from the external NFC device, the NFC module being configured to monitor the contactless interface of the NFC module to receive and transmit the first data to the NFC card through the contact interface of the NFC card if the NFC card does not emit the second data to the NFC device before a timeout.

23. The terminal of claim 11, wherein, when the contact interface of the NFC card is selected, the NFC module is configured to forward data received from the external NFC device to a processor of the terminal and to forward data received from the processor to the external NFC device.

24. The terminal of claim 11, wherein, when the contact interface of the NFC card is selected:
- the NFC card is further configured to transmit data through the contactless interface of the NFC card to the NFC module; and
- the NFC module is configured to forward the data to a processor of the terminal and to forward, via the contactless interface of the NFC module to the contactless interface the NFC card, NFC data received from the processor.

25. The terminal of claim 11, wherein the NFC card is further configured to emit data via the contactless interface of the NFC card by emitting bursts of magnetic field from the antenna coil, so as to compensate for effects of the conductive screen on a maximum distance for transmitting data by load modulation.

* * * * *